(No Model.)
W. E. CLARKE.
DEVICE FOR ATTACHING SUSPENDER ENDS.
No. 332,785. Patented Dec. 22, 1885.
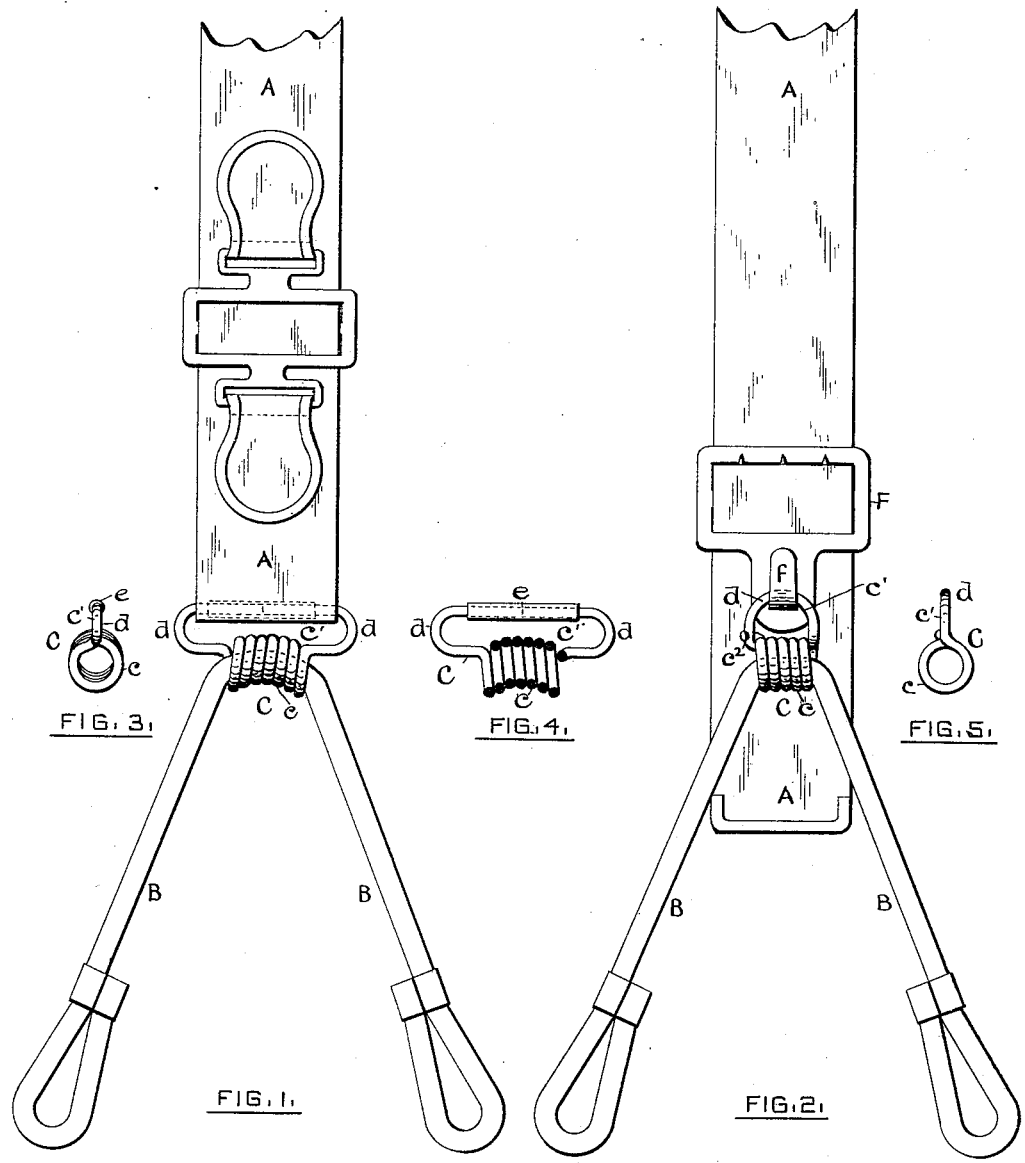
WITNESSES:
Henry J. Stapelton.
Geo. M. Cady.
INVENTOR:
William E. Clarke
by Edson Salisbury Jones
Attorney.

UNITED STATES PATENT OFFICE.

WILLIAM E. CLARKE, OF PROVIDENCE, RHODE ISLAND.

DEVICE FOR ATTACHING SUSPENDER-ENDS.

SPECIFICATION forming part of Letters Patent No. 332,785, dated December 22, 1885.

Application filed October 26, 1885. Serial No. 181,008. (No model.)

*To all whom it may concern:*

Be it known that I, WILLIAM E. CLARKE, of the city and county of Providence, and State of Rhode Island, have invented a new and useful Improvement in Devices for Attaching the Ends of Suspenders to the Shoulder-Straps thereof; and I do hereby declare the following specification, taken in connection with the accompanying drawings, forming a part of the same, to be a description thereof.

This invention relates to the device by which the suspender-ends are attached to the shoulder-straps; and it consists in a device or loop composed of a continuous piece of wire wound spirally into a tubular portion for receiving the suspender-end, and bent into an eye to enable it to be attached to the shoulder-strap, as hereinafter described and claimed.

In the accompanying drawings, Figure 1 represents a portion of a shoulder-strap of a pair of suspenders with the end attached to said strap by a device embodying my improvement. Fig. 2 shows the device in the form of a "cast-off" to enable the suspender-end to be detached readily from the shoulder-strap. Fig. 3 represents an end view of the device shown in Fig. 1. Fig. 4 shows a front view of the same with the tubular portion in section. Fig. 5 represents an end view of the device shown in Fig. 2.

A is the shoulder-strap. B is the suspender-end, and C is the device or loop by which the end is attached to the strap.

The device C is composed of a continuous piece of wire, which is wound spirally into a tubular portion, $c$, and then bent at $d$ to form an eye, $c'$, to enable the device to be attached to the shoulder-strap. The eye $c'$ in Figs. 1, 3, and 4 is oblong in form, and the ends of the wire, after being bent at $d$, extend toward each other, and are secured together by a tube, $e$, encircling them. The tubular portion C may be straight throughout its length, as shown in Fig. 2, but preferably it has a longitudinal curvature, as shown in Figs. 1 and 4, to enable the end B to slide or work more easily in it when in use.

The device C, (shown in Figs. 2 and 5,) is particularly adapted for a cast-off. It has a spirally-wound tubular portion, $c$, and an eye, $c'$, for attachment to the hook $f$ of the buckle F, and the ends of the wire composing the device are bent around each other at $c^2$, to secure them together.

The device or loop C, made in accordance with my invention, is simple and inexpensive in construction, and is strong and durable, and when made of round or oval wire it presents no sharp corners or edges to cut, chafe, or abrade the suspender.

What I claim, and desire to secure by Letters Patent, is—

1. The improved device or loop C, for attaching the ends of suspenders to the shoulder-straps thereof, composed of a continuous piece of wire wound spirally into a tubular portion, $c$, to receive the suspender-end, and bent to form an eye, $c'$, for attachment to the shoulder-strap, substantially as set forth.

2. The device C composed of a continuous piece of wire and having a spirally-wound tubular portion, $c$, longitudinally curved throughout its length, and an eye, $c'$, substantially as and for the purposes specified.

3. The device C, for attaching the ends of suspenders to the shoulder-straps thereof, composed of a continuous piece of wire having its ends secured to each other, and having a spirally-wound tubular portion, $c$, and an eye, $c'$, projecting from such portion, substantially as set forth.

WILLIAM E. CLARKE.

Witnesses:
EDSON SALISBURY JONES,
HENRY J. STAPELTON.